Patented Aug. 24, 1948

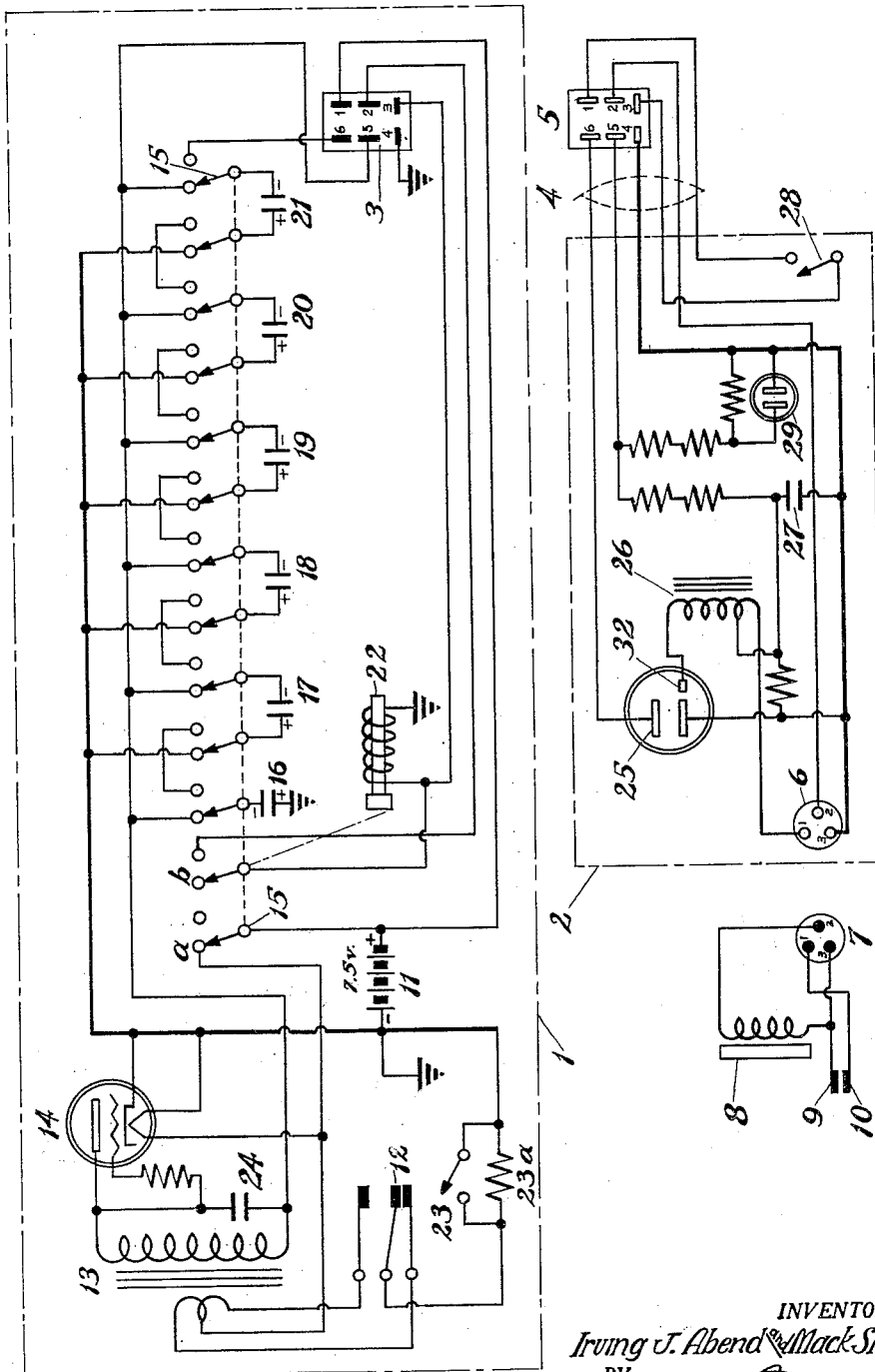

2,447,832

UNITED STATES PATENT OFFICE 2,447,832

PHOTOGRAPHIC FLASH APPARATUS

Irving J. Abend and Mack Slepoff,
New York, N. Y.

Application July 27, 1946, Serial No. 686,703

3 Claims. (Cl. 315—237)

This invention relates to photographic flash outfits, and more particularly to a type whereby repeated flashes can be secured from a completely portable, lightweight, battery-operated unit.

At the present time, efforts have been made to produce satisfactorily-operating devices of this general character, but the same, as presently known, present problems which have not been completely solved. Chief among the problems with which the designer of these devices has had to contend, has been the matter of weight and complete portability. Some of the battery-operated devices as known at the present time, contemplate the use of very heavy re-chargeable wet batteries as well as the use of large and weighty condensers, transformers and rectifier tubes, the result of the use of these components of the flash unit being a bulky and extremely heavy device lacking the portability which a structure of this kind requires to make it practical and useful to the photographer, and especially to the journalist-photographer whose work requires infallibility of operation, lightness of weight, speed of action and simplicity of control.

The present apparatus was therefore devised with the above requirements in view, and the object of the invention is to provide a simple, lightweight and compact structure by means of which repeated flashes can be secured with a minimum of power consumption; which can employ standard and universally-procurable flashlight batteries as the source of voltage and which batteries will have long life when given normal use and treatment.

The improved unit further contemplates the employment of readily-procurable parts of compact and lightweight construction; it also contemplates the use of a signal means by which the operator is advised when the unit is in operative condition, and in addition, it provides means by which positive synchronism of the camera shutter with the flash can be secured, to thus insure accurate and positive results.

Another object of the invention is to provide in a structure of this character, means by which the charging rate of condensers employed in the circuit can be controlled to thereby avoid undue drain on the batteries, particularly in those periods when the operator is unlikely to be called upon to take a picture, yet at the same time maintain the condensers partly charged to thereby enable a fully-charged condition of the condensers to be secured with minimum delay, thereby placing the unit in condition for flashing speedily, while at the same time avoiding undue drain on the batteries and thereby increasing the life of the same.

More particularly, the invention contemplates the provision of a unit of the character described having a relatively low voltage input (which can be approximately six to twelve volts) and obtainable from several replaceable flashlight cells; of simple charging means for charging a plurality of compact and lightweight electrolytic condensers; of switch means by which the charging rate of said condensers can be controlled; of visible signal means by which the complete charging of the condensers and thus the placing of the device in readiness for flashing, will be indicated to the operator, and of switch means, coupled and synchronized with the camera shutter, by which the condensers are discharged and the bulb is flashed.

These and numerous other objects to be hereinafter set forth, are attained by the construction hereinafter described and more particularly pointed out in the claims appended hereto.

In the drawing, a schematic diagram of the improved flashing device is disclosed, and as therein shown it will be noted that it is composed of two main units, namely, that enclosed within the dot-and-dash lines 1, constituting the power supply and batteries, and that shown within the enclosure indicated at 2 which consists of the flash-gun assembly.

Unit indicated at 1 has its elements compactly arranged so that the entire unit may be housed within a small carrying case readily slung from the shoulder of the operator. A female outlet receptacle or socket indicated at 3, enables the necessary electrical connections to be established between unit 1 and unit 2 by means of a six-wire cable 4 extending from unit 2 and terminating in a six-prong plug received in the receptacle 3.

Flash-gun unit 2 is also provided with a female outlet socket 6 adapted for the reception of a three-prong plug 7 at the end of a three-wire cable leading from the camera shutter solenoid 8 and contacts 9, 10. Thus, through the several sockets, and the plugs received in the same, connection between units 1 and 2 and between unit 2 and the shutter solenoid and contacts is established.

Referring to the power supply and battery unit, 11 indicates the batteries, which may be a number of easily-procurable dry cell flashlight batteries connected together to provide an output voltage of 7.5 volts (and which may be increased or slightly decreased if desired).

The power supply includes a vibrator 12, high-voltage power transformer 13 and a small rectifier tube 14. The operation of the device is controlled by a multiple charging switch 15, which, by its operation, serves to place a number of small 450 volt electrolytic condensers, indicated at 16 to 21 inclusive, in parallel to be charged to approximately 400 to 460 volts by the output of the power supply elements just described, said condensers being subsequently put in series to produce from 2400 to 2760 volts.

Included also in unit 1, is a release solenoid 22, high and low current switch 23, and buffer condenser 24, the parts being electrically connected as shown in the drawing.

In the flash-gun unit 2 is the flash bulb 25, which is of the gas-filled multiple flash type now available in the open market, the trigger spark coil 26, the trigger discharge condenser 27, the flash switch 28 and the neon charge-indicating tube 29, and several resistances connected as shown in the drawing.

To prepare for flashing of the flash bulb 25, the charge switch 15 is cocked or placed in the position shown in the drawing. That is to say, the batteries 11 are connected to the power supply means 12, 13 and 14 through the charging switch contacts a and the same switch acts to place the condensers 16 to 21 inclusive in parallel to be charged to voltage of from 400 to 460 volts. The switch 15 is held in this position by means of the solenoid 22.

When the condensers 16 to 21 inclusive have reached the full charge, the neon charge-indicating light, operative through resistances as shown in unit 2 and which drop the voltage to the neon light 29 to its required operating voltage, will light, thus indicating to the operator that the device is in readiness for flashing. At this time, the trigger discharge condenser will have been charged to approximately fifty volts.

To flash the flash tube 25, the flash switch 28 is now closed. This actuates the release solenoid 22, allowing the multiple switch 15 to throw and thereby place the six charged condensers 16 to 21 inclusive in series across the flash tube and providing approximately 2400 to 2760 volts. The contacts b of the multiple switch 15 are arranged to be closed only after all of the other contacts on the switch 15 are closed, and when the contacts b close, the camera shutter solenoid is actuated, this opening the shutter and closing the associated contacts 9 and 10. The closing of the contacts 9 and 10 allows the trigger discharge condenser 27 to discharge through the trigger spark coil 26 and produce a high voltage (10-30 kilovolts) at the trigger anode 32 of the flash tube 25. The tube 25 then conducts and the condensers 16 to 21 which are then in series, discharge through the flash tube 25, causing an intense daylight flash.

The flashes may be repeated with relatively short intervals between them, since charging of the condensers 16 to 21 is very rapid. The speed with which these condensers can be charged is controlled by the use of the high and low charging switch 23, which, when open, passes the current through an impedance 23a resulting in the delivery of lowered voltage to the power supply means 12, 13 and 14 and in reduced drain on the batteries. To bring the condensers up to maximum charge is then merely a matter of closing the switch 23 and by-passing the impedance 23a to then deliver maximum voltage from the batteries to the power supply elements, causing the same to result in maximum output and quickly bring the condensers to maximum charge. In other words, when the operator is in expectation of being called upon to take a picture, he then maintains switch 23 in open position and just before preparing to operate the flashing switch he will throw switch 23 to closed position and thus quickly bring the condensers up to maximum charge. The neon light signal 29 will then indicate the fact that the apparatus is in condition for flashing and the flash may be then operated.

While we have described one embodiment of the invention, it is obvious that the same is not to be restricted thereto, but is broad enough to cover all structures coming within the scope of the annexed claims.

What we claim is:

1. In a flash-bulb igniting apparatus, a battery of relatively low-voltage, voltage-amplifying means connected to the battery, a plurality of parallel-connected condensers connected to the output of the voltage-amplifying means, a gas-filled flash bulb, switch means for discharging the condensers and flashing the bulb, voltage control means consisting of a resistance for restricting voltage out-put from amplifying means to the condensers and switch means for by-passing said resistance to allow maximum voltage to reach the condensers from the voltage amplifying means.

2. In a flash-bulb igniting apparatus, batteries, power supply means connected thereto, a plurality of condensers normally connected in parallel to the output of the power-supply means, a flash tube, switch means for placing the condensers in series across the flash tube, a trigger discharge condenser and spark coil connected to the flash bulb, and a flashing switch connected in the circuit and operative to discharge the trigger discharge condenser through the spark coil to thereby flash the bulb.

3. In a flash bulb igniting apparatus, a flash bulb, a plurality of condensers, power supply means connected to said condensers while said condensers are connected in parallel, a multiple switch by means of which said condensers may be connected in series, a solenoid for maintaining the switch in position to maintain the parallel connection between the condensers, a flash switch connected in circuit with the solenoid to actuate the same to permit the multiple switch to be shifted to place the condensers in series, a trigger discharge condenser and a spark coil, and switch means controlled by the multiple switch and operative thereby after the condensers are placed in series, to produce voltage at the trigger anode of the flash bulb and cause discharge of the condensers then in series, through the flash bulb.

IRVING J. ABEND.
MACK SLEPOFF.

REFERENCES CITED

The following references are of record in the file of this patent:

UNITED STATES PATENTS

| Number | Name | Date |
|---|---|---|
| 2,047,463 | Dubilier | July 14, 1936 |
| 2,071,958 | Watrous | Feb. 23, 1937 |
| 2,144,873 | Dimond | Jan. 24, 1939 |
| 2,331,771 | Germeshausen | Oct. 12, 1943 |
| 2,341,541 | Grier | Feb. 15, 1944 |
| 2,358,796 | Edgerton | Sept. 26, 1944 |
| 2,383,492 | Klemperer | Aug. 28, 1945 |